NOISE COMPARISON SIGNAL DETECTING SYSTEM

Filed May 13, 1954

William R. Mercer
INVENTOR.
BY [signature]
ATTORNEY

United States Patent Office 2,871,346
Patented Jan. 27, 1959

2,871,346

NOISE COMPARISON SIGNAL DETECTING SYSTEM

William R. Mercer, Belmont, Mass., assignor, by mesne assignments, to Sanders Associates, Incorporated, Nashua, N. H., a corporation of Delaware Application May 13, 1954, Serial No. 429,491

3 Claims. (Cl. 250—20)

This invention replates to the art of electronic detection such as is employed, for example, in radar. More particularly, this invention relates to electronic detection devices which are responsive to pulses of electromagnetic energy.

The problem of discriminating low energy signals from noise background is common in electronics. In the present invention it is desired to code and detect such a signal so as to discriminate against locally generated noise, such as microphonics, and to utilize the coherence properties of the signal so as to obtain particularly effective discrimination against random noise.

An object of this invention is to provide an improved electronic detector having increased sensitivity to the presence of a desired signal;

A further object of the invention is to provide a system of the character described having an improved means for selecting an actual signal and for discriminating against spurious signal indications; and A still further object of the invention is to provide a system of the character described with means for selecting a desired signal having an energy level less than the energy level of the background noise which is present.

Other objects of the invention will be apparent from the following description of a preferred embodiment thereof, taken in connection with the accompanying drawings.

In accordance with the present invention there is provided an electronic detecting system for developing a control voltage verifying the presence of desired signal pulses as distinguished from random noise pulses. The signal pulses recur at a predetermined rate, as for example, received radar pulses. The system includes a time discriminator responsive to the signal pulses and a time reference generator for developing reference pulses which recur at the same predetermined rate as the signal pulses. Means are provided coupling the reference generator and the discriminator. Reference pulses control the time of response of the discriminator to the signal pulses. The discriminator controls the reference generator to synchronize the reference pulses with the signal pulses. A phase reference generator is provided for developing a phase reference voltage to displace the reference pulses with respect to time in a predetermined manner to effect, thereby, a voltage output from the discriminator in response to the signal pulses and displaced reference pulses. A phase detector is provided responsive to the phase difference between the output of the time discriminator and the phase reference voltage for developing the control voltage of the system only in response to the desired signal pulses.

Figure 1:
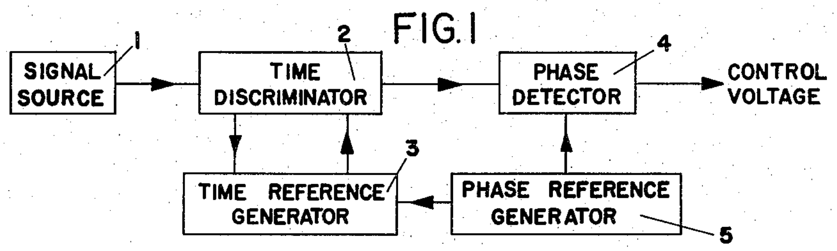
Fig. 1 is a block diagram of an electronic detection system embodying the invention.

Referring now in more detail to the drawings, in Fig. 1 there is illustrated a system for producing a control voltage in response to a desired signal. The system comprises a signal source 1 coupled to a time discriminator 2 which in turn is coupled to a time reference pulse generator 3 and a phase detector 4, as illustrated. The time discriminator 2 may be of the type described and illustrated in "Electronic Time Measurements" (Chance et al., published by McGraw-Hill Book Company, 1949). This book is volume 20 of the "Radiation Laboratory Series." A time discriminator of the type useful in the present invention is illustrated on pages 97 and 98. The general character of such time discriminators is described and illustrated on pages 308–321, inclusive. A phase reference voltage generator 5 is coupled to both the generator 3 and the detector 4. The signal source 1 provides a series of pulses, herein termed video, as illustrated by the curve *a* of Fig. 3. The generator 3 develops a series of reference pulses illustrated by the curve *b* of Fig. 3. The time discriminator operates conventionally to relate the occurrences of reference pulses and signal pulses.

Figure 3:
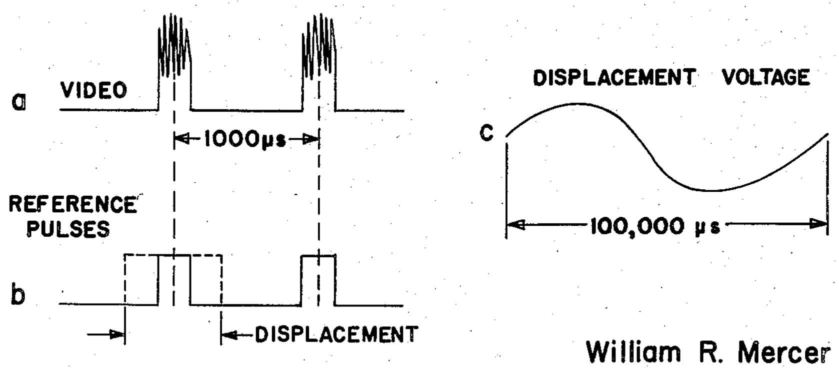
Fig. 3 illustrates voltage wave forms that appear in the operation of the system in Fig. 1.

The generator 5 provides a source of sinusoidal voltage preferably with a period of 100,000 microseconds as illustrated by the curve *c* of Fig. 3. In other embodiments of the invention it may be preferred to utilize a different form of wave, for example a unidirectional or square wave, for this purpose. This voltage is employed to oscillate the positions of the reference pulses with respect to time. The detector 4 develops a control voltage in response to the phase relationship between the phase reference voltage from genertaor 5 and the output voltage of the discriminator 2.

Figure 2:
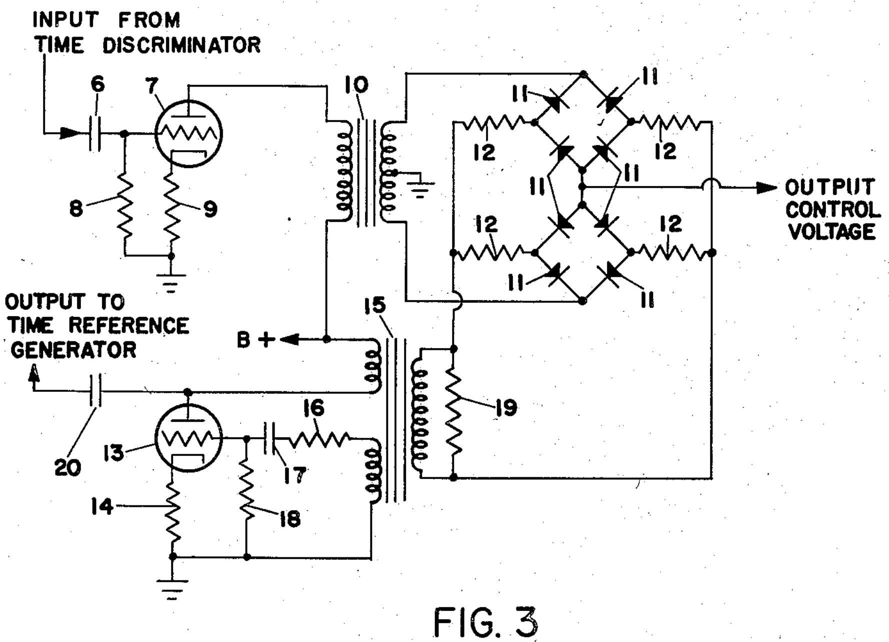
Fig. 2 is a schematic circuit diagram of a part of the system of Fig. 1.

Fig. 2 illustrates in detail the circuit of the detector 4 and generator 5. An input amplifier comprising a triode 7 and its associated components, hereinafter referred to, has been added. The output of time discriminator 2 is coupled through capacitor 6 to the grid of the triode amplifier tube 7 and appears across grid resistor 8. The cathode of tube 7 is connected through the bias resistor 9 to ground; its plate is connected through the primary of coupling transformer 10 to a source of positive voltage indicated at B+. The secondary of the transformer 10 is connected to one branch of the phase detector, comprising rectifiers 11 and resistors 12, as shown. The center tap of the secondary of transformer 10 is connected to ground. The phase reference voltage is developed by the generator circuit associated with a triode 13. The cathode of triode 13 is connected through its bias resistor 14 to ground. Its plate is connected through the primary of a transformer 15 to the source of voltage indicated at B+. An output is coupled through capacitor 20 to the time reference generator 3. The energy for regeneration of this circuit is coupled to a secondary of transformer 15, through a limiting resistor 16, capacitor 17 to the grid of triode 13 and appears across grid resistor 18 to ground. Another output of the generator 3 is coupled to the other secondary of transformer 15, appears across load resistor 19 and is connected to the other branches of the phase detector, as shown. The output of the phase detector appears as a D. C. voltage between the junction point of the two bridges and ground.

Referring now in more detail to the operation of the system, it is pointed out that conventional systems comprise the signal source 1, the detector 2 and the time reference generator 3. These circuits are also capable of detecting the presence of a signal in which the average energy level of the signal is much less than that of the background noise. However, these circuits are also responsive to noise that simulate actual signals. In order to increase the probability of responding only to desired signals, the sensitivity of the system conventionally is sharply reduced. The sensitivity of systems of the prior art is so adjusted that they become responsive only to signal pulses having an energy level higher than the level of the background noise. This, of course, has the effect of excluding desired signal pulses of low energy content.

In the present invention means are added whereby the control voltage is produced only in response to the presence of actual signals and detection is permitted of desired signal pulses having energy levels below that of the background noise.

Explaining the operation of the improved system in detail, when the signal pulses or video pulses are not synchronous with the reference pulses, the time discriminator 2 produces a correction voltage. This voltage is applied to the generator 3 to vary the time positions of the reference pulses. Since the time positions of the reference pulses may lead or lag the signal pulses, the polarity of the error signal is correspondingly negative or positive. Thus, if the error signal is a function of noise only, its average value is zero, if measured for a sufficiently long time; however, the instantaneous correction voltages produced by noise cause the time positions of the reference pulses to shift in a random fashion.

If, however, at the times the reference pulses occur, portions of the signal pulses are present, the time discriminator produces an error signal that is a function of these portions. The time discriminator continues to produce an error signal until such time as the centers of the signal and reference pulses are aligned. Although the time reference pulses are displaced by the background noise, the displacement occurs about average time positions which coincide with the centers of the signal pulses. That is to say, at the time that the signal pulses and the reference pulses are synchronous, the average error signal of the time discriminator is zero.

When the energy of the noise background exceeds the energy level of the signal, the instantaneous noise fluctuations cause the time discriminator 2 to produce corresponding error fluctuations that may be so large that the reference pulses no longer occur at the time that the signal occurs and the noise pulses take over control. That is, the time positions of the reference pulses become random with respect to the time positions of the signal pulses. It is important to note that during the time intervals in which the signal pulses occur, the level of energy present (signal plus noise) exceeds that of any other interval; consequently, the system tends to synchronize with weak signals.

An output of the phase reference generator 5 causes the time positions of the reference pulses to oscillate. The time discriminator 2 compares the energies present in successive time intervals and determines the average difference. A comparison of time intervals during which only random noise is present produces no differences and the time positions of the reference pulses shift randomly. When, however, time intervals during which signal pulses plus noise are present, are compared with intervals during which noise only is present, the error signal produced by the time discriminator is characterized by an A. C. voltage.

If an actual signal is present the A. C. voltage produced by the time discriminator 2 is characterized by a continuing, fixed phase relationship to the A. C. voltage output of the phase reference generator 5. If the two voltages occur in phase or precisely out of phase, the phase detector 4 produces a D. C. control voltage.

Thus, it will be seen that in the present system the verification of a desired signal is obtained by comparing the total amount of energy that exists in a large number of successive signal pulses with the total amount of energy of the background noise that occurs during an equivalent amount of time. Obviously, if the energy of the background noise is much greater than the energy level of the signal pulses, a very large number of signal pulses must be examined.

While there has been hereinbefore described what is at present considered a preferred embodiment of the invention, it will be apparent that many and various changes and modifications may be made with respect to the embodiment illustrated without departing from the spirit of the invention. It will be understood, therefore, that all those changes and modifications as fall fairly within the scope of the present invention, as defined in the appended claims, are to be considered as a part of the present invention.

What is claimed is:

1. An electronic detecting system for developing a control voltage verifying the presence of desired signal pulses as distinguished from random noise pulses, said signal pulses recurring at a predetermined rate, comprising a time discriminator responsive to said signal pulses; a time reference generator for developing reference pulses which recur at the same predetermined rate as said signal pulses; means coupling said reference generator and said discriminator, said reference pulses controlling the time of response of said discriminator to said signal pulses and said discriminator controlling said reference generator to synchronize said reference pulses with said signal pulses; a phase reference generator for developing a phase reference voltage to displace said reference pulses with respect to time in a predetermined manner, effecting thereby a voltage output from said discriminator in response to said signal pulses and displaced reference pulses; and a phase detector, responsive to the phase difference between said output of said time discriminator and said phase reference voltage, developing said control voltage of said system only in response to said desired signals pulses.

2. An electronic detecting system for developing a control voltage in response to desired signal pulses recurrent at a predetermined repetition rate for verifying the presence of desired signal pulses as distinguished from random noise pulses, comprising: a source of signals to provide desired signal pulses recurrent at said predetermined rate; a source of noise signals; receiver means responsive to said noise and desired signals for receiving electromagnetic energy signal pulses during relatively short predetermined time intervals recurrent at said predetermined rate; reference generator means coupled to said receiver means to provide a reference signal for controlling the time of occurrence of said short time intervals at least in part to precede and succeed the time of occurrence of said desired signal pulses, thereby to receive noise pulses during predetermined time intervals not coincident with said predetermined rate; means for integrating the amplitudes of said received signals to provide an integrated signal representative of desired signal pulses; and comparator means responsive to said reference and integrated signals for developing a control voltage representative of said desired signal.

3. An electronic detecting system for developing a control voltage in response to desired signal pulses which recur at a predetermined repetition rate for verifying the presence of desired signal pulses as distinguished from random noise pulses, comprising: a source of signals including noise and desired signal pulses; receiver means for receiving electromagnetic energy including noise and desired signal pulses during relatively short, predetermined time intervals recurrent at said predetermined rate, including a time discriminator means for controlling the time of response of said receiver means; phase reference means to provide a phase reference signal for controlling said discriminator means to vary the time of reception of said receiver means relative to the time of occurrence of said signal pulses to receive noise pulses before and after the reception of each signal pulse during time intervals varying about said predetermined rate; and phase comparator means for developing said control voltage in response to the difference in phase between the integrated amplitudes of said signal-plus-noise pulses and said reference signal.

References Cited in the file of this patent

UNITED STATES PATENTS

| | | |
|---|---|---|
| 2,446,244 | Richmond | Aug. 3, 1948 |
| 2,466,959 | Moore | Apr. 12, 1949 |
| 2,475,074 | Bradley et al. | July 5, 1949 |
| 2,564,005 | Halpern et al. | Aug. 14, 1951 |
| 2,617,093 | Flyer | Nov. 4, 1952 |
| 2,677,758 | Robinson et al. | May 4, 1954 |